US012786038B2

(12) United States Patent
Gu et al.

(10) Patent No.: US 12,786,038 B2
(45) Date of Patent: Nov. 3, 2026

(54) IQ IMBALANCE COMPENSATION METHOD FOR WIFI BROADBAND TRANSMITTING AND RECEIVING PATHS, AND APPLICATION

(71) Applicant: Shanghai WUQI Microelectronics Co., Ltd., Shanghai (CN)

(72) Inventors: Qiang Gu, Shanghai (CN); Jinbang Zong, Shanghai (CN)

(73) Assignee: Shanghai WUQI Microelectronics Co., Ltd., Shanghai (CN)

( * ) Notice: Subject to any disclaimer, the term of this patent is extended or adjusted under 35 U.S.C. 154(b) by 44 days.

(21) Appl. No.: 18/764,279

(22) Filed: Jul. 4, 2024

(65) Prior Publication Data

US 2024/0364574 A1 Oct. 31, 2024

Related U.S. Application Data

(63) Continuation of application No. PCT/CN2022/108588, filed on Jul. 28, 2022.

(30) Foreign Application Priority Data

Jan. 7, 2022 (CN) ........................ 202210016521.0

(51) Int. Cl.
*H04L 27/38* (2006.01)
*H04L 27/36* (2006.01)

(52) U.S. Cl.
CPC ........ *H04L 27/3863* (2013.01); *H04L 27/364* (2013.01)

(58) Field of Classification Search
CPC ............... H04L 27/3863; H04L 27/364; H04L 27/3854; H03D 3/009; H04B 17/11; H04B 17/21; H04B 1/40; H04B 1/0032
See application file for complete search history.

(56) References Cited

U.S. PATENT DOCUMENTS 7,830,954 B2 * 11/2010 Welz ...................... H03D 3/009 455/67.14
8,379,767 B2 * 2/2013 Zhu ..................... H04L 27/3863 375/322
9,385,656 B2 * 7/2016 Tseng ..................... H03D 3/009
2011/0069744 A1 3/2011 Laudel et al.
2015/0071391 A1 3/2015 Wilhelmsson et al.

FOREIGN PATENT DOCUMENTS

CN 114374593 A 4/2022

* cited by examiner

*Primary Examiner* — Betsy Deppe
(74) *Attorney, Agent, or Firm* — JEEN IP LAW, LLC

(57) ABSTRACT

This application discloses an IQ imbalance compensation method for WiFi broadband transmitting and receiving paths and application thereof. This application relates to the field of digital signal processing. The method includes: inputting IQ signals into a frequency-related IQ imbalance compensation device FD-IQMC wherein the FD-IQMC device first performs frequency-independent overall compensation on IQ imbalance by means of a frequency-independent IQ imbalance compensation module FI-iqmc, and then selecting one signal from the IQ signals and inputting same into a Frac-delay filter and an Amp-FIR filter so as to respectively perform phase and amplitude compensation of frequency-selectivity; and inputting non-selected signal into a delay module to be time-aligned with the selected signal.

4 Claims, 7 Drawing Sheets

IQ IMBALANCE COMPENSATION METHOD FOR WIFI BROADBAND TRANSMITTING AND RECEIVING PATHS, AND APPLICATION

CROSS-REFERENCE TO RELATED APPLICATIONS

The application claims priority to Chinese patent application No. 202210016521.0, filed on Jan. 7, 2022, the entire contents of which are incorporated herein by reference.

FIELD OF THE TECHNOLOGY

This application relates to the field of digital signal processing, and specifically, to an IQ imbalance compensation method for WiFi broadband transmitting and receiving paths and application thereof.

BACKGROUND OF THE DISCLOSURE

As wireless communication technology has been developing towards high speed, miniaturization and integration in recent years, zero intermediate frequency (ZIF) architecture transceivers have been widely used in electronic systems with high bandwidth and high sampling rates, due to its low cost and easy integration. The ZIF architecture uses analog quadrature mixing technology to directly convert RF signals into baseband in-phase (I) and quadrature (Q) signals, thus requiring fewer analog components than the traditional superheterodyne architecture. However, analog devices have certain non-ideal characteristics due to design limitations, resulting in I/Q imbalance (IQ imbalance) due to amplitude and phase mismatch between I and Q signals, leading to problems such as constellation diagram distortion, increased bit error rate and EVM deterioration, affecting the performance of the communication system. In broadband communication systems with higher silicon integration and larger modulation orders, the above-mentioned I/Q imbalance problem is often further aggravated. Considering that WiFi6/WiFi6E needs to support larger bandwidth (e.g. 160 MHz) and higher modulation modes (e.g. 1024QAM/4096QAM), the system design of high bandwidth and high-order modulation puts forward more stringent standards and requirements for the calibration and compensation of the non-ideal characteristics of the RF front-end.

Currently, the industry has proposed a variety of IQ imbalance estimation methods and digital compensation schemes to improve communication quality. Traditional research on solving the IQ imbalance problem usually adopts frequency-independent (FI) imbalance error, and the FI imbalance error value is a constant. The above method is difficult to meet the performance requirements of broadband systems: for broadband systems, the amplitude and phase imbalance errors introduced by factors such as inconsistent frequency response of devices between I/Q channels will change with the change of signal frequency, which is a frequency-dependent (FD) error. With the use of larger bandwidths (80 MHz/160 MHz) in the fifth-generation wireless network technology (WiFi5) and the sixth-generation network technology (WiFi6), the traditional frequency-independent IQ (FI-IQ) compensation method can no longer meet the performance requirements of the system. It is necessary to use digital signal processing technology based on the frequency selectivity of IQ imbalance to perform broadband frequency-dependent IQ (FD-IQ) compensation to improve the overall quality of large-bandwidth signals.

As an example, the frequency selectivity of IQ imbalance over a broadband is described by combining the zero-IF model of the transmit (TX) path shown in FIG. 1 and the zero-IF model of the receive (RX) path shown in FIG. 2. The main sources of IQ imbalance in the TX path in FIG. 1 are the DAC (Digital-to-Analog Converter, also known as D/A converter), low-pass filter, IQ amplifier and mixer. The main sources of IQ imbalance in the RX path in FIG. 2 are the mixer, IQ amplifier, low-pass filter and ADC (Analog-to-Digital Converter, also known as A/D converter). Since the imbalance of the mixer's local oscillator (LO) produces a fixed deviation in IQ, the three devices that mainly provide frequency selectivity in the model are DAC/ADC, low-pass filter, and IQ amplifier. When the IQ signals pass through these three devices, the amplitude gain and phase changes are mismatched and show different characteristics in the frequency domain. The larger the bandwidth, the more obvious the change in IQ error. This is the source of the frequency selectivity of IQ imbalance in broadband.

Currently, there are mainly three methods for processing the above broadband IQ imbalance.

The first method is to add a sequence of known good characteristics to the signal through a training sequence, and the sequence needs to be continuously sent and received during communication for calibration, and then the calculated characteristics are compensated. The calibration method has a complicated process and reduces the transmission efficiency.

The second method is to perform frequency domain compensation after testing the IQ characteristics through a single tone. This calibration method is easily affected by factors such as frequency deviation, which affects the accuracy.

The third method is a blind estimation method, which sends a broadband signal, calculates and statistics the IQ characteristics, and then designs and compensates the complex filter. This calibration method requires a large amount of statistical data, has a slow calculation process, and has a large resource overhead in the compensation structure.

On the other hand, for three types of devices, such as DAC/ADC, low-pass filters, and IQ amplifiers, their double-sideband responses at baseband frequency and after cascading show symmetrical characteristics, that is, the amplitude response is a symmetrical even function, and the phase response is an odd function. At the same time, it was found in the study that the frequency selectivity of the IQ error can be approximately expressed as a distribution characteristic of amplitude symmetry and phase linear change, see the distribution diagram of the measured broadband IQ amplitude error shown in FIG. 3, and the distribution diagram of the measured broadband IQ phase error shown in FIG. 4. The above-mentioned type of zero intermediate frequency structure has the characteristics of stronger low-pass characteristics and less significant band-pass effect.

Based on the above-mentioned prior art, how to provide a compensation scheme that can compensate for IQ imbalance with frequency selectivity, and has the advantages of easy structure control, low resource overhead and high compensation accuracy is a technical problem needs to be solved urgently at present.

SUMMARY

The purpose of the application is to overcome the deficiencies of the prior art, and to provide IQ imbalance compensation method for WiFi broadband transmitting and receiving paths and application thereof. The method comprising a frequency-dependent IQ imbalance compensation device FD-IQMC, the FD-IQMC device is used for IQ imbalance compensation on an IQ signal. Wherein, the FD-IQMC device comprises a non-frequency-selective compensation structure, and a frequency-selective compensation structure corresponding to phase and amplitude respectively. The FD-IQMC device performs IQ imbalance compensation based on a pre-compensation in a transmitting path, and performs IQ imbalance compensation based on a post-compensation in a receiving path. The application has the advantages of easy structure control, low resource overhead and high compensation accuracy, and can effectively reduce the image rejection ratio IRR, EVM degradation and bit error rate.

To achieve the above goals, the application provides the following technical solutions.

An IQ imbalance compensation method for WiFi broadband transmitting and receiving paths, the method comprising: for a transmitting path, an IQ signal output by a TX Baseband is input into a frequency-dependent IQ imbalance compensation device FD-IQMC for frequency-dependent IQ imbalance compensation, and the compensated output signal I'Q' is input to a digital-to-analog converter DAC; and for a receiving path, an IQ signal output by an analog-to-digital converter ADC is input into a frequency-dependent IQ imbalance compensation device FD-IQMC for frequency-dependent IQ imbalance compensation, and the compensated output signal I'Q' is input to a RX Baseband. Wherein the FD-IQMC device comprises a FI-iqmc module, a Frac-delay filter and an Amp-FIR filter. The FI-iqmc module is a frequency-independent IQ imbalance compensation module. The Frac-delay filter is a fractional delay filter. The Amp-FIR filter is a real number symmetric amplitude filter.

Wherein, the FD-IQMC device is configured to: for an input IQ signal, according to an IQ imbalance parameter estimation value of the path, the FI-iqmc module performs single-point compensation for the input I-channel signal and the Q-channel signal by selecting the amplitude and phase error of one frequency point, so as to perform a frequency-independent overall compensation for the IQ imbalance; and then, for the I-channel signal and Q-channel signal output from the FI-iqmc module, selecting one of the signals to be input into the Frac-delay filter for phase compensation to compensate for the imbalance in the frequency-selective phase, and then input the signal output from the Frac-delay filter into the Amp-FIR filter for amplitude compensation to compensate for the imbalance in the frequency selectivity amplitude; meanwhile, the other signal that is not selected is processed by the delay module to be time-aligned with the selected signal.

Further, the IQ imbalance parameter estimation value of the transmitting path and the receiving path is obtained by single-tone testing, and the single tones of multiple frequency points correspond to the IQ imbalance parameter estimation values of multiple frequency points.

Further, the FI-iqmc module is configured to: for a signal $x=\cos(\theta)+j\sin(\theta)$, wherein j is a complex number, according to a phase imbalance factor $\Delta\varphi$ and an amplitude imbalance factor $\Delta m$ in the IQ imbalance parameter estimation value, the compensation phase and compensation amplitude required by the I-channel signal are set to $-\Delta\varphi/2$ and $-\Delta m/2$ respectively, and the compensation phase and compensation amplitude required by the Q-channel signal are set to $\Delta\varphi/2$ and $\Delta m/2$ respectively, and the IQ imbalance is compensated as an overall by the following compensation formula:

$$M_{comp}*x=\begin{bmatrix}\cos(\Delta\varphi/2)-\Delta m/2\cdot\cos(\Delta\varphi/2) & \sin(\Delta\varphi/2)-\Delta m/2\cdot\sin(\Delta\varphi/2)\\ \sin(\Delta\varphi/2)+\Delta m/2\cdot\sin(\Delta\varphi/2) & \cos(\Delta\varphi/2)+\Delta m/2\cdot\cos(\Delta\varphi/2)\end{bmatrix}\begin{bmatrix}I\\ Q\end{bmatrix}$$

wherein, x represents the IQ signal input to the FI-iqmc module, and the factor $M_{comp}$ represents the compensation matrix of phase and amplitude.

Further, when the factor $\Delta\varphi$ is less than a preset value, $\sin(\Delta\varphi)$ is set equal to $\Delta\varphi$, $\cos(\Delta\varphi)$ is equal to 1, according to this, the formula of the factor $M_{comp}$ is simplified, and a simplified factor $M'_{comp}$ is as follows:

$$M'_{comp}=\begin{bmatrix}1-\Delta m/2 & \Delta\varphi/2\\ \Delta\varphi/2 & 1+\Delta m/2\end{bmatrix}$$

and then, the IQ imbalance is compensated as an overall by the following compensation formula:

$$M'_{comp}*x=\begin{bmatrix}1-\Delta m/2 & \Delta\varphi/2\\ \Delta\varphi/2 & 1+\Delta m/2\end{bmatrix}\begin{bmatrix}I\\ Q\end{bmatrix}=x+\{-\Delta m/2*I+\Delta\varphi/2*Q+j(\Delta\varphi/2*I+\Delta m/2*Q)\}$$

at this time, the FI-iqmc module performs a matrix multiplication on the input signal through four multipliers to compensate for the frequency-independent IQ imbalance.

Further, the steps of performing phase compensation on one signal output by the FI-iqmc module through a Frac-delay filter are as follows:

obtaining the phase error of the sampling frequency point within the broadband through single-tone testing of multiple frequency points;

performing linear fitting on the obtained phase error;

calculating a factor Group delay according to the phase error after linear fitting, the factor Group delay represents the phase error group delay in the broadband, and the calculation formula is as follows:

$$\text{Group delay}=\frac{\Delta\varphi\,(\text{radian})}{\Delta\omega\,(\text{radian})}$$

Wherein, $\Delta\varphi$(radian) is the phase error change within the $\Delta\omega$(radian) frequency band; calculating a fractional delay sample value to be compensated according to the value of the factor Group delay, and then, designing the fractional delay value of the Frac-delay filter through the Lagrange interpolation method based on the fractional delay sample value to be compensated;

performing phase compensation on the selected signal according to the designed Frac-delay filter, and a phase-compensated signal is obtained.

Further, while the Frac-delay filter performs phase compensation to one signal output by the FI-iqmc module, another signal that is not selected is input into a D1 module for delay processing to align the time of the two signals, wherein the D1 module represents the first delay module.

Further, the steps of performing amplitude compensation on the signal output by the Frac-delay filter through an Amp-FIR filter are as follows:

obtaining the amplitude error of the sampling frequency point within the broadband through single-tone testing of multiple frequency points;

performing an averaging operation on the amplitude error of the frequency point with symmetric positive and negative frequencies;

designing a real number filter with an order of N, wherein the amplitude error parameters of the filter frequency point are obtained through piecewise linear interpolation of the test frequency point, the parameter N is an integer multiple of 2;

calculating the filter coefficient of the real number filter through an inverse fast Fourier transform method according to the amplitude error parameters of the filter frequency point, wherein the filter coefficient is a real number and the coefficient is symmetric;

filtering the signal through the filter coefficient, and an amplitude-compensated signal is obtained.

Further, while the Amp-FIR filter performs amplitude compensation on the signal output by the Frac-delay filter, the signal output from the D1 module is input into a D2 module for delay processing to align the time of the two signals, wherein the D2 module represents the second delay module.

Corresponding to the method, the application also provides a three-stage IQ imbalance compensation system for WiFi broadband transmitting and receiving paths. The system comprises a frequency-dependent IQ imbalance compensation device FD-IQMC. In the design of the present application, the FD-IQMC can be arranged in a transmitting path for pre-compensating an IQ signal to be input to a digital-to-analog converter DAC, and the FD-IQMC may also be arranged in a receiving path for post-compensating an IQ signal output by an analog-to-digital converter ADC. The FD-IQMC device comprises a FI-iqmc module, a Frac-delay filter and an Amp-FIR filter. The FI-iqmc module is a frequency-independent IQ imbalance compensation module, and the Frac-delay filter is a fractional delay filter, and the Amp-FIR filter is a real number symmetric amplitude filter.

The FD-IQMC device is configured to: for an input IQ signal, according to an IQ imbalance parameter estimation value of the path, the FI-iqmc module performs single-point compensation for the input I-channel signal and the Q-channel signal by selecting the amplitude and phase error of one frequency point, so as to perform a frequency-independent overall compensation for the IQ imbalance; and then, for the I-channel signal and Q-channel signal output from the FI-iqmc module, selecting one of the signals to be input into the Frac-delay filter for phase compensation to compensate for the imbalance in the frequency-selective phase, and then input the signal output from the Frac-delay filter into the Amp-FIR filter for amplitude compensation to compensate for the imbalance in the frequency selectivity amplitude; meanwhile, the other signal that is not selected is processed by the delay module to be time-aligned with the selected signal.

Further, the application provides another IQ imbalance compensation method for WiFi broadband transmitting and receiving paths. The method comprising: for a transmitting path, an IQ signal output by a TX Baseband is input into a frequency-dependent IQ imbalance compensation device FD-IQMC for frequency-dependent IQ imbalance compensation, and the compensated output signal I'Q' is input to a digital-to-analog converter DAC; for a receiving path, an IQ signal output by an analog-to-digital converter ADC is input into a frequency-dependent IQ imbalance compensation device FD-IQMC for frequency-dependent IQ imbalance compensation, and the compensated output signal I'Q' is input to a RX Baseband. Wherein the FD-IQMC device comprises a FI-iqmc module and a single-channel filter module, the FI-iqmc module is a frequency-independent IQ imbalance compensation module, and the filter coefficient of the single-channel filter is a real number asymmetric form, and the filter coefficient of the single-channel filter is generated by convolving a fractional delay filter coefficient and an amplitude filter coefficient; the phase-frequency response of the single-channel filter compensates for the fractional delay, and the amplitude-frequency response of the single-channel filter compensates for the amplitude error.

The FD-IQMC device is configured to: for an input IQ signal, according to an IQ imbalance parameter estimation value of the path, the FI-iqmc module performs single-point compensation for the input I-channel signal and the Q-channel signal by selecting the amplitude and phase error of one frequency point, so as to perform a frequency-independent overall compensation for the IQ imbalance; and then, for the I-channel signal and Q-channel signal output from the FI-iqmc module, selecting one of the signals to be input into the single-channel filter for processing to compensate for the phase and amplitude of frequency-selectivity; meanwhile, the other signal that is not selected is processed by the delay module to be time-aligned with the selected signal.

Corresponding to the method, the application also provides an IQ imbalance compensation system for WiFi broadband transmitting and receiving paths. The system comprises a frequency-dependent IQ imbalance compensation device FD-IQMC. The FD-IQMC device can be arranged in a transmitting path for pre-compensating an IQ signal to be input to a digital-to-analog converter DAC, and the FD-IQMC may also be arranged in a receiving path for post-compensating an IQ signal output by an analog-to-digital converter ADC. The FD-IQMC device comprises a FI-iqmc module and a single-channel filter module. The FI-iqmc module is a frequency-independent IQ imbalance compensation module. The filter coefficient of the single-channel filter is a real number asymmetric form. Specifically, the filter coefficient of the single-channel filter is generated by convolving a fractional delay filter coefficient and an amplitude filter coefficient; the phase-frequency response of the single-channel filter compensates for the fractional delay, and the amplitude-frequency response of the single-channel filter compensates for the amplitude error.

The FD-IQMC device is configured to: for an input IQ signal, according to an IQ imbalance parameter estimation value of the path, the FI-iqmc module performs single-point compensation for the input I-channel signal and the Q-channel signal by selecting the amplitude and phase error of one frequency point, so as to perform a frequency-independent overall compensation for the IQ imbalance; and then, for the I-channel signal and Q-channel signal output from the FI-iqmc module, selecting one of the signals to be input into the single-channel filter for processing to compensate for the phase and amplitude of frequency-selectivity; meanwhile, the other signal that is not selected is processed by the delay module to be time-aligned with the selected signal.

Compared with the prior art, the application has the following advantages and positive effects due to the adoption of the above technical solution, as an example: the IQ imbalance compensation method performs IQ imbalance compensation on the IQ signal through a FD-IQMC device. Specifically, the FD-IQMC device includes a non-frequency-selective compensation structure and a frequency-selective compensation structure, performs IQ imbalance compensation in the transmitting path based on a pre-compensation, and performs IQ imbalance compensation in the receiving path based on a post-compensation. By performing broadband IQ calibration through the application, it is possible to compensate for IQ imbalance with frequency-selectivity. The application has the advantages of easy structure control, low resource overhead and high compensation accuracy, and can effectively reduce the image rejection ratio IRR, EVM degradation and bit error rate. In turn, the communication quality can be effectively improved.

DETAILED DESCRIPTION

An IQ imbalance compensation method for WiFi broadband transmitting and receiving paths, and application disclosed in the application will be further described in detail below with reference to the accompanying drawings and specific embodiments. It should be noted that the combinations of technical features or technical features described in the following embodiments should not be considered as isolated, and they may be combined with each other to achieve better technical results. In the accompanying drawings of the following embodiments, the same symbols appearing in each of the accompanying drawings represent the same features or components that can be applied in different embodiments. Thus, once an item is defined in one of the accompanying drawings, no further discussion of it is required in subsequent drawings.

It should be noted that the structures, proportions, dimensions, etc. shown in the attached drawings of this specification are only for the purpose of understanding and reading by those skilled in the art in accordance with the contents disclosed in this specification, and are not intended to limit the conditions under which the application can be implemented. Any modification of the structure, change of the proportion relationship, or adjustment of the size, without affecting the efficacy and purpose of the application, should fall within the scope of the technical content disclosed by the application. The scope of the preferred embodiments of the application includes alternative implementations in which the functions may be performed out of the order described or discussed, including performing the functions in a substantially simultaneous manner or in the reverse order depending upon the functions involved, which should be embodiments of the application will be understood by those skilled in the art to which the embodiments of the application pertain.

Techniques, methods and devices known to those of ordinary skill in the relevant art may not be discussed in detail, but where appropriate, such techniques, methods, and devices should be considered part of the authorized description. In all examples shown and discussed herein, any specific value should be construed as illustrative only and not as limiting. Accordingly, other examples of exemplary embodiments may have different values.

Embodiments

The application provides an IQ imbalance compensation method for WiFi broadband transmitting and receiving paths, which realizes frequency-dependent IQ compensation by setting a frequency-dependent IQ imbalance compensation device FD-IQMC in a signal digital processing channel. The FD-IQ compensation (be abbreviated as FD-IQ) is suitable for frequency-selective IQ imbalance compensation of a transmit (TX) and receive (RX) path.

Figure 1:
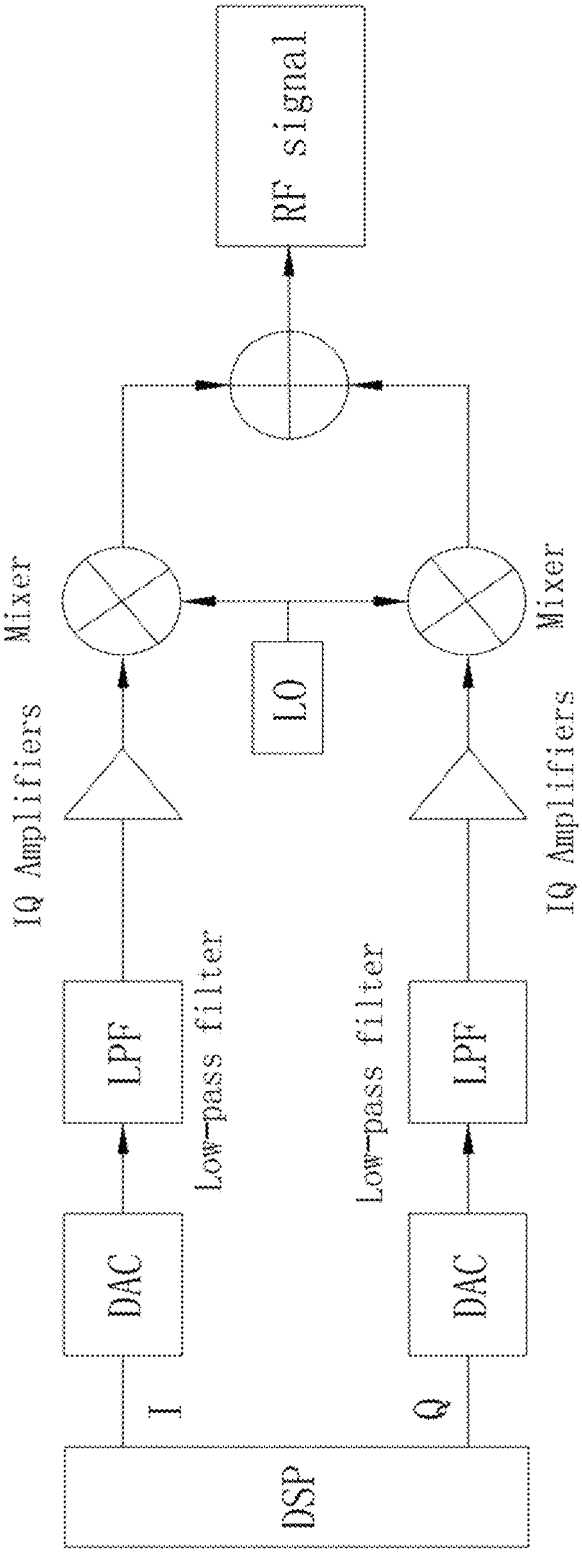
FIG. 1 is a diagram of a TX zero intermediate frequency model.
Figure 2:
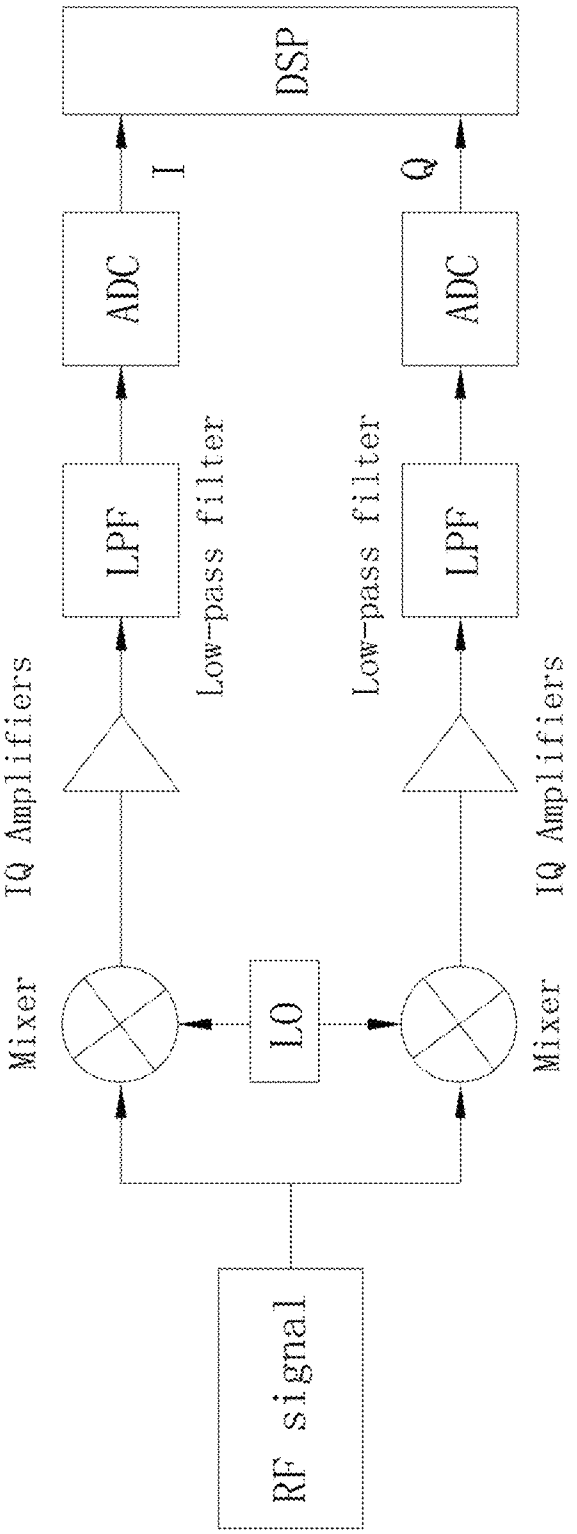
FIG. 2 is a diagram of an RX zero intermediate frequency model.
Figure 3:
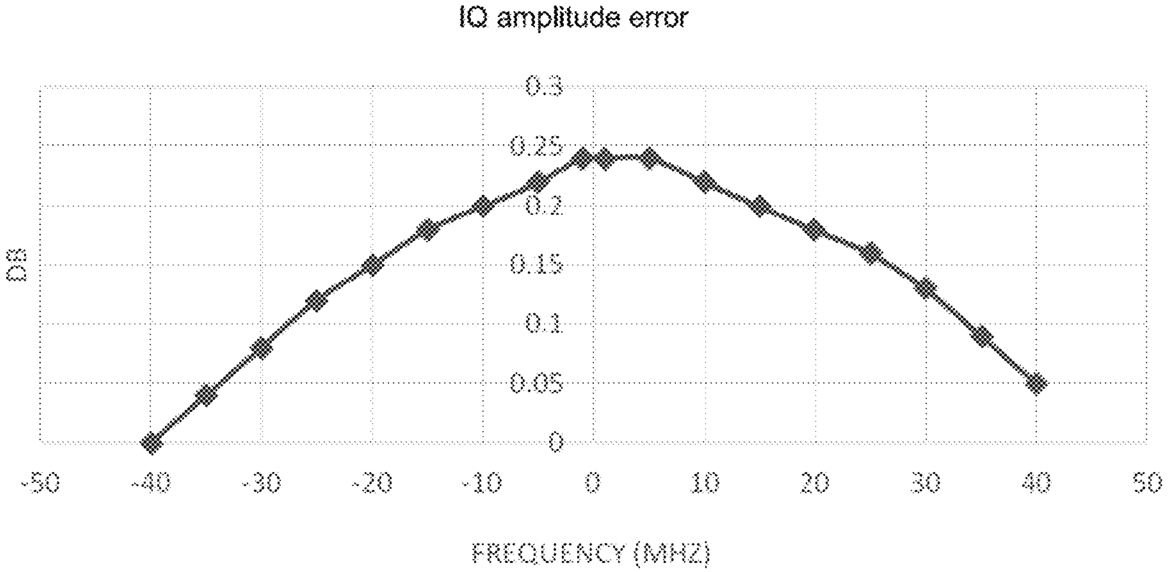
FIG. 3 is a distribution diagram of the broadband IQ amplitude error.
Figure 4:
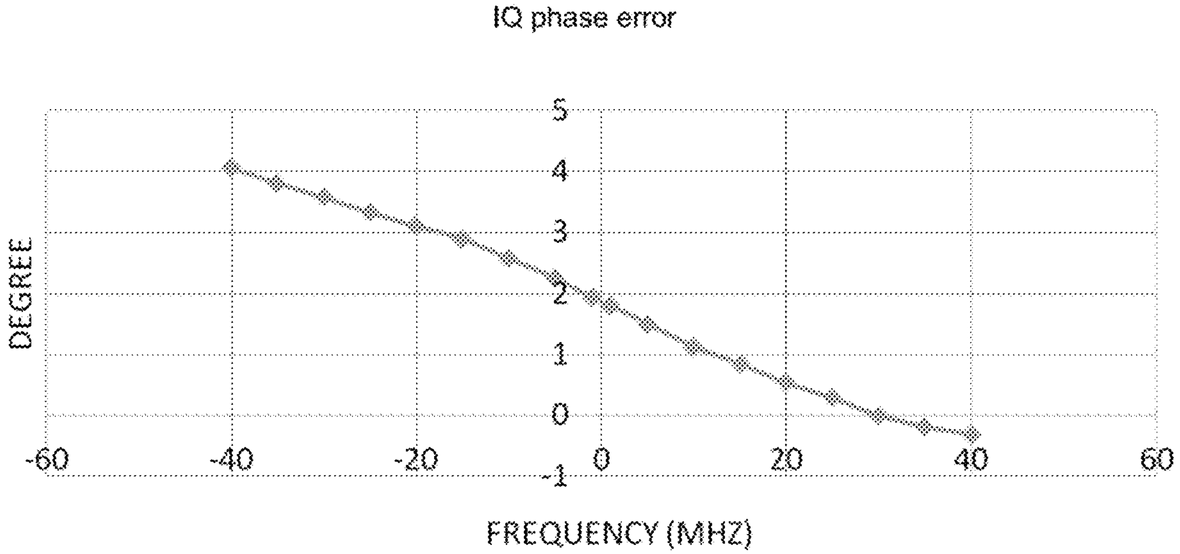
FIG. 4 is a distribution diagram of the broadband IQ phase error.
Figure 5:
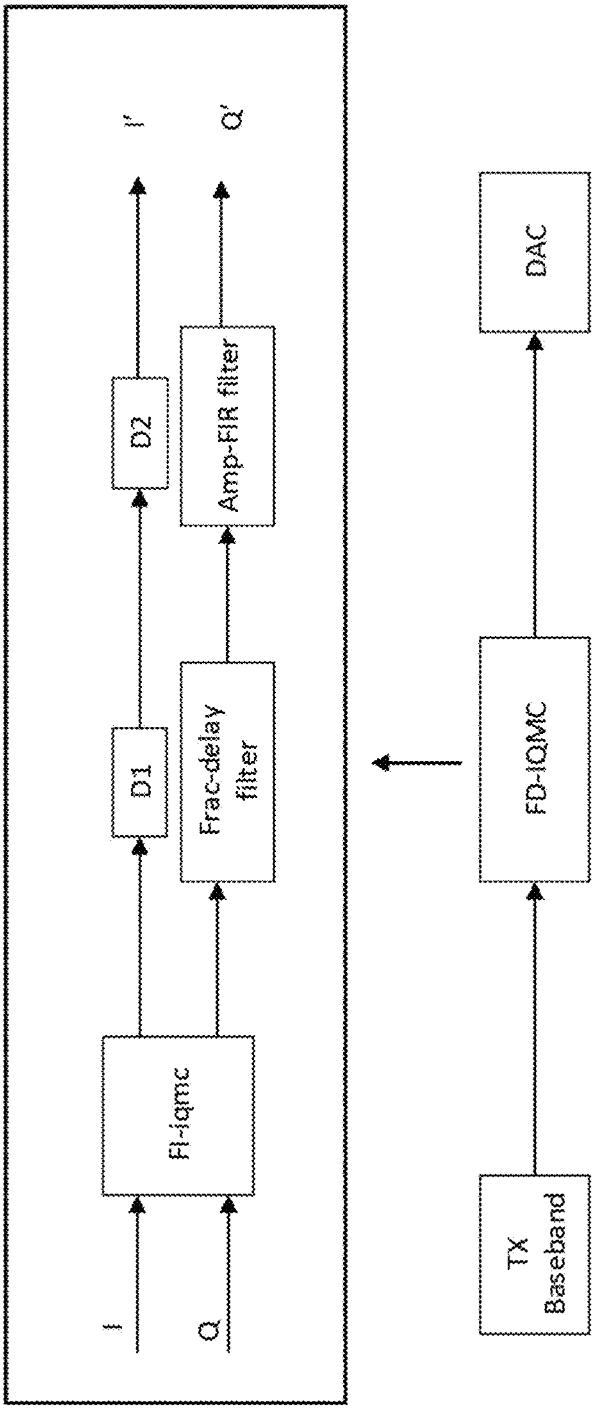
FIG. 5 is a logical diagram of a transmitting path IQ imbalance compensation structure provided by the application.

For a transmitting path, as shown in FIG. 5, an IQ signal output by a TX Baseband is input into a frequency-dependent IQ imbalance compensation device FD-IQMC for frequency-dependent IQ imbalance compensation, and the compensated output signal I'Q' is input into the digital-to-analog converter DAC.

Figure 6:
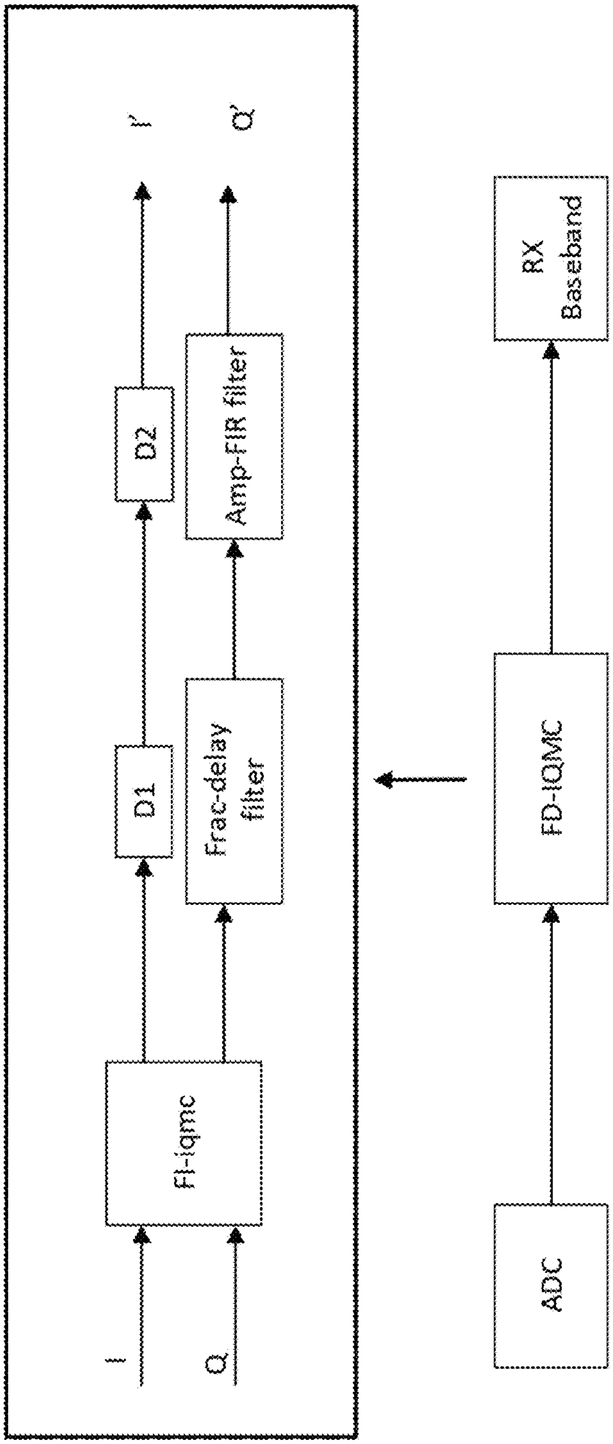
FIG. 6 is a logical diagram of a receiving path IQ imbalance compensation structure provided by the application.

For a receiving path, as shown in FIG. 6, an IQ signal output by the analog-to-digital converter ADC is input into a frequency-dependent IQ imbalance compensation device FD-IQMC for frequency-dependent IQ imbalance compensation, and the compensated output signal I'Q' is input into a RX Baseband.

In this embodiment, an IQ imbalance parameter estimation value of the transmitting path and the receiving path can be obtained by single-tone testing. Specifically, a single-tone signal (e.g. a single-tone signal with a frequency of ω) is sent, and then a loop signal is collected, and an IQ imbalance parameter is estimated by a correlation calculation method. The IQ imbalance parameter may specifically include an amplitude imbalance factor (also known as an amplitude mismatch parameter) and a phase imbalance factor (also known as a phase mismatch parameter). Single tones at different frequencies correspond to different IQ imbalance parameter estimation values, and single-tone testing at multiple frequencies can obtain IQ imbalance parameter estimation values at multiple frequencies. In this embodiment, the parameter estimates of the transmit and receive paths are measured separately by switching the internal circuit switches.

In this embodiment, the FD-IQMC device adopts a cascaded three-stage compensation structure. Specifically, the FD-IQMC device comprises a first-stage non-frequency-selective compensation structure, a second-stage phase filter structure and a third-stage amplitude filter structure, three structures are cascaded. For an input IQ signal, the FD-IQMC device is processed in turn through a first-stage non-frequency-selective compensation structure, a second-stage phase filter structure and a third-stage amplitude filter structure according to the IQ imbalance parameter estimation value of the transmitting path and the receiving path.

Specifically, the first-stage non-frequency-selective compensation structure is a FI-iqmc module, and the FI-iqmc module is a frequency-independent IQ imbalance compensation module. As shown in FIG. 5 and FIG. 6, the I-channel signal and the Q-channel signal of an IQ signal are input into the FI-iqmc module, and the amplitude and phase errors of a frequency point are selected for single-point compensation, so as to perform a frequency-independent overall compensation for the IQ imbalance.

The single-tone signal can be expressed as x=cos (θ)+j sin (θ), wherein j is a complex number. The overall compensation principle of the FI-iqmc is as follows.

For a single-tone signal x=cos (θ)+j sin (θ), a phase imbalance factor and an amplitude imbalance factor in the IQ imbalance parameter estimation value can be obtained by single-tone testing. Suppose that the phase imbalance factor is Δφ and the amplitude imbalance factor is Δm, due to IQ imbalance, the phases that need to be compensated for the I and Q paths are −Δφ/2 and Δφ/2 respectively, at this time, a signal expression after phase compensation is:

$$x_{comp\_phase} = \cos(\theta - \Delta\varphi/2) + j\sin(\theta + \Delta\varphi/2) = \begin{bmatrix} \cos(\Delta\varphi/2) & \sin(\Delta\varphi/2) \\ \sin(\Delta\varphi/2) & \cos(\Delta\varphi/2) \end{bmatrix} \begin{bmatrix} I \\ Q \end{bmatrix}$$

And the amplitudes that need to be compensated for the I and Q paths are −Δm/2 and Δm/2 respectively, at this time, a signal expression after amplitude compensation is:

$$x_{comp\_amp} = \cos(\theta) - \Delta m/2 \cdot \cos(\theta) + j\left(\sin(\theta) + \Delta m/2 \cdot \sin(\theta)\right) = \begin{bmatrix} 1 - \Delta m/2 & 0 \\ 0 & 1 + \Delta m/2 \end{bmatrix} \begin{bmatrix} I \\ Q \end{bmatrix}$$

The signal expression after phase and amplitude compensation is:

$$x_{comp} = \begin{bmatrix} 1 - \Delta m/2 & 0 \\ 0 & 1 + \Delta m/2 \end{bmatrix} \begin{bmatrix} \cos(\Delta\varphi/2) & \sin(\Delta\varphi/2) \\ \sin(\Delta\varphi/2) & \cos(\Delta\varphi/2) \end{bmatrix} \begin{bmatrix} I \\ Q \end{bmatrix}$$

The calculation formula for the compensation matrix $M_{comp}$ is:

$$M_{comp} = \begin{bmatrix} 1 - \Delta m/2 & 0 \\ 0 & 1 + \Delta m/2 \end{bmatrix} \begin{bmatrix} \cos(\Delta\varphi/2) & \sin(\Delta\varphi/2) \\ \sin(\Delta\varphi/2) & \cos(\Delta\varphi/2) \end{bmatrix} = \begin{bmatrix} \cos(\Delta\varphi/2) - \Delta m/2 \cdot \cos(\Delta\varphi/2) & \sin(\Delta\varphi/2) - \Delta m/2 \cdot \sin(\Delta\varphi/2) \\ \sin(\Delta\varphi/2) + \Delta m/2 \cdot \sin(\Delta\varphi/2) & \cos(\Delta\varphi/2) + \Delta m/2 \cdot \cos(\Delta\varphi/2) \end{bmatrix}$$

The compensation algorithm of the FI-iqmc module is:

$$M_{comp} * x = \begin{bmatrix} \cos(\Delta\varphi/2) - \Delta m/2 \cdot \cos(\Delta\varphi/2) & \sin(\Delta\varphi/2) - \Delta m/2 \cdot \sin(\Delta\varphi/2) \\ \sin(\Delta\varphi/2) + \Delta m/2 \cdot \sin(\Delta\varphi/2) & \cos(\Delta\varphi/2) + \Delta m/2 \cdot \cos(\Delta\varphi/2) \end{bmatrix} \begin{bmatrix} I \\ Q \end{bmatrix}$$

wherein, x represents the IQ signal input to the FI-iqmc module, and the factor $M_{comp}$ represents the compensation matrix of the phase and amplitude.

In a preferred embodiment, considering that the aforementioned phase imbalance factor Δφ is generally small (because the imbalance deviation is generally small), and when Δφ is small, sin (Δφ)≈Δφ, cos (Δφ)≈1. Therefore, the compensation matrix $M_{comp}$ is simplified to reduce the compensation structure resource overhead.

In the specific implementation, the Δφ can be compared with a preset value. When Δφ is less than the preset value, sin (Δφ) can be set equal to Δφ, and cos (Δφ) can be set equal to 1, that is, sin (Δφ/2) is equal to Δφ/2, and cos (Δφ/2) is equal to 1. Substituting into the compensation matrix $M_{comp}$, the following formula can be obtained:

$$M_{comp} = \begin{bmatrix} 1 - \Delta m/2 & (1 - \Delta m/2) \cdot \Delta\varphi/2 \\ (1 + \Delta m/2) \cdot \Delta\varphi/2 & 1 + \Delta m/2 \end{bmatrix}$$

Since Δφ is small, the product value of the formula (Δm/2·Δφ/2) is also very small. Let (Δm/2·Δφ/2)=0, and the simplified compensation matrix $M'_{comp}$ can be obtained:

$$M'_{comp} = \begin{bmatrix} 1 - \Delta m/2 & \Delta\varphi/2 \\ \Delta\varphi/2 & 1 + \Delta m/2 \end{bmatrix}$$

and then, the IQ imbalance is compensated as an overall by the following compensation formula:

$$M'_{comp} * x = \begin{bmatrix} 1 - \Delta m/2 & \Delta\varphi/2 \\ \Delta\varphi/2 & 1 + \Delta m/2 \end{bmatrix} \begin{bmatrix} I \\ Q \end{bmatrix} = x + \{-\Delta m/2 * I + \Delta\varphi/2 * Q + j(\Delta\varphi/2 * I + \Delta m/2 * Q)\}$$

At this time, in the FI-iqmc module, the frequency-independent IQ imbalance can be compensated by using four multipliers to perform a matrix multiplication on the input signal.

For the I-channel signal and Q-channel signal output from the FI-iqmc module, selecting one of the signals and input into the second-stage phase filter structure and the third-stage amplitude filter structure in sequence for processing, meanwhile, the other signal that is not selected is delayed by the delay module to be time-aligned with the selected signal.

In this embodiment, the second-stage phase filter structure is a Frac-delay filter. The Frac-delay filter is a fractional delay filter, which can perform phase compensation on the input signal, so as to compensate for the imbalance in the frequency-selective phase.

For ZIF structures such as DAC/ADC, low-pass filters, and IQ amplifiers, the frequency-selective phase error of their IQ imbalance is generally linear, that is, the IQ phase error within the broadband presents a phase change or an approximate phase change. Utilizing the above linear characteristics, this embodiment uses a Frac-delay filter to compensate for this phase imbalance when setting the phase filter structure. And the Frac-delay filter adopts a single-channel filter and performs compensation processing on only one channel of the I channel and the Q channel.

Specifically, the steps of performing phase compensation on one signal (the I-channel signal or the Q-channel signal) output by the FI-iqmc module through a Frac-delay filter module are as follows.

S211, obtaining the phase errors of the sampling frequency points within the broadband through single-tone testing of multiple frequency points.

S212, performing linear fitting on the obtained phase errors.

S213, calculating a factor Group delay according to the phase errors after linear fitting, the factor Group delay represents the phase error group delay in the broadband, and the calculation formula is as follows:

$$\text{Group delay} = \frac{\Delta\varphi\ (\text{radian})}{\Delta\omega\ (\text{radian})}$$

Δφ(radian) is the phase error change within the Aw (radian) frequency band.

S214, calculating a fractional delay sample value to be compensated according to the value of the factor Group delay, and then, designing the fractional delay value of the Frac-delay filter through the Lagrange interpolation method based on the fractional delay sample value to be compensated.

S215, performing phase compensation on the selected signal (the I-channel signal or the Q-channel signal) according to the designed Frac-delay filter, and a phase-compensated signal is obtained.

When the Frac-delay filter module performs phase compensation on the one signal output by the FI-iqmc, the other unselected signal is input into the first delay module D1 for delay processing to align the time of the two signals.

As shown in FIG. 5 and FIG. 6, an example of processing the Q-channel signal is performed by the Frac-delay filter module, that is, the Q signal is selected, and the I signal is input into the first delay module D1 for delay processing to align the time of the two signals (the I-channel signal and the Q-channel signal).

The signal output from the Frac-delay filter module is then input into the third-stage amplitude filter structure for processing.

In this embodiment, the third-stage amplitude filter structure is an Amp-FIR filter. The Amp-FIR filter is a real number symmetric amplitude filter, which can perform amplitude compensation on the signal to compensate for the imbalance in frequency-selective amplitude.

For ZIF structures such as DAC/ADC, low-pass filters, IQ amplifiers, etc., the frequency selectivity amplitude error of their IQ imbalance is generally manifested as an even function distribution, that is, it is manifested as a bilateral symmetric characteristic of positive and negative frequencies. Utilizing the above symmetry characteristics, this embodiment selects the Amp-FIR filter to compensate for this amplitude imbalance when an amplitude filter needs to be set. Compared with the conventional direct use of complex filters for compensation, this embodiment can significantly reduce resource overhead and chip area while ensuring that the performance accuracy meets the requirements.

Specifically, the steps of performing amplitude compensation on the signal output by the Frac-delay filter through the real symmetric amplitude filter Amp-FIR filter are as follows.

S311, obtaining the amplitude errors of the sampling frequency points within the broadband through single-tone testing of multiple frequency points.

S312, performing an averaging operation on the amplitude errors of the frequency points with symmetric positive and negative frequencies.

S313, designing a real number filter with an order of N, wherein the amplitude error parameters of the filter frequency points are obtained through piecewise linear interpolation of the test frequency points, the parameter N is an integer multiple of 2.

S314, calculating the filter coefficients of the real number filter through an inverse fast Fourier transform (IFFT) method according to the amplitude error parameters of the filter frequency points, wherein the filter coefficients are real numbers and are symmetric.

S315, filtering the signal through the filter coefficients, and an amplitude-compensated signal is obtained.

As shown in FIG. 5 and FIG. 6, when the Amp-FIR filter module performs amplitude compensation on the phase-compensated Q-channel signal output by the Frac-delay filter, the I-channel signal output from the D1 is input into the second delay module D2 for delay processing to align the time of the two signals.

In the embodiment provided by the application, estimates the IQ imbalance parameter based on a single-tone testing method in a broadband, and adopts a time domain compensation, so that it does not require a specific training sequence, nor does it use broadband signals for a large number of calculation statistics. And the time domain compensation is more stable than the frequency domain compensation. Meantime, based on the characteristic law of the ZIF structures such as DAC/ADC, low-pass filters, and IQ amplifiers, the cascaded real number filter compensation design is configured. Compared with the conventional use of complex filters, the application reduces resource overhead and chip area, while ensuring performance accuracy.

Another embodiment of the present application further provides a three-stage IQ imbalance compensation system for WiFi broadband transmitting and receiving paths. The system is used to implement the steps in the above method.

The system comprising a frequency-dependent IQ imbalance compensation device FD-IQMC. The FD-IQMC can be arranged in a transmitting path for pre-compensating an IQ signal to be input to a digital-to-analog converter DAC, and the FD-IQMC may also be arranged in a receiving path for post-compensating an IQ signal output by an analog-to-digital converter ADC. Wherein the FD-IQMC device comprises a FI-iqmc module, a Frac-delay filter and an Amp-FIR filter; the FI-iqmc module is a frequency-independent IQ imbalance compensation module, and the Frac-delay filter is a fractional delay filter, and the Amp-FIR filter is a real number symmetric amplitude filter.

The FD-IQMC device is configured to: for an input IQ signal, according to an IQ imbalance parameter estimation value of the path, the FI-iqmc module performs single-point compensation for the input I-channel signal and the Q-channel signal by selecting the amplitude and phase error of one frequency point, so as to perform a frequency-independent overall compensation for the IQ imbalance, wherein the IQ imbalance parameters include a phase error information and an amplitude error information. And then, for the I-channel signal and Q-channel signal output from the FI-iqmc module, selecting one of the signals to be input into the Frac-delay filter for phase compensation to compensate for the imbalance in the frequency-selective phase, and then input the signal output from the Frac-delay filter into the Amp-FIR filter for amplitude compensation to compensate for the imbalance in the frequency selectivity amplitude. Meanwhile, the other signal that is not selected is processed by the delay module to be time-aligned with the selected signal.

Figure 7:
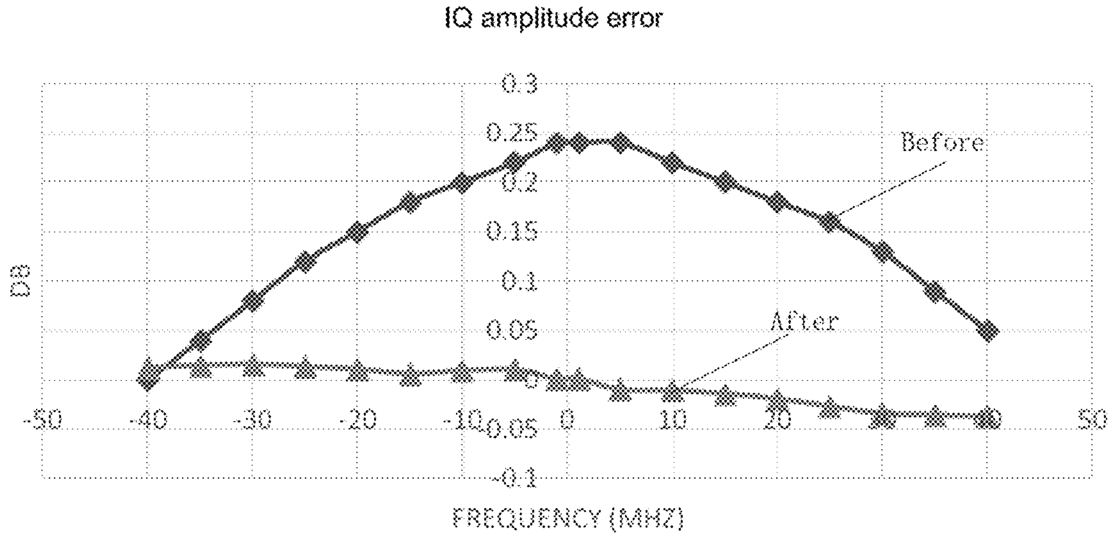
FIG. 7 is a diagram showing changes in the IQ amplitude error before and after compensation by the application.
Figure 8:
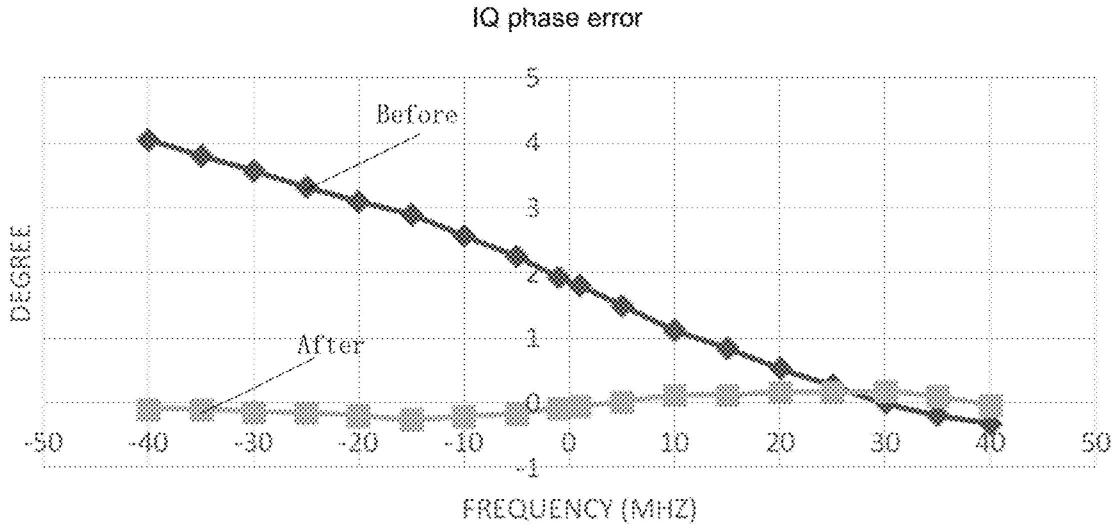
FIG. 8 is a diagram showing changes in the IQ phase error before and after compensation by the application.
Figure 9:
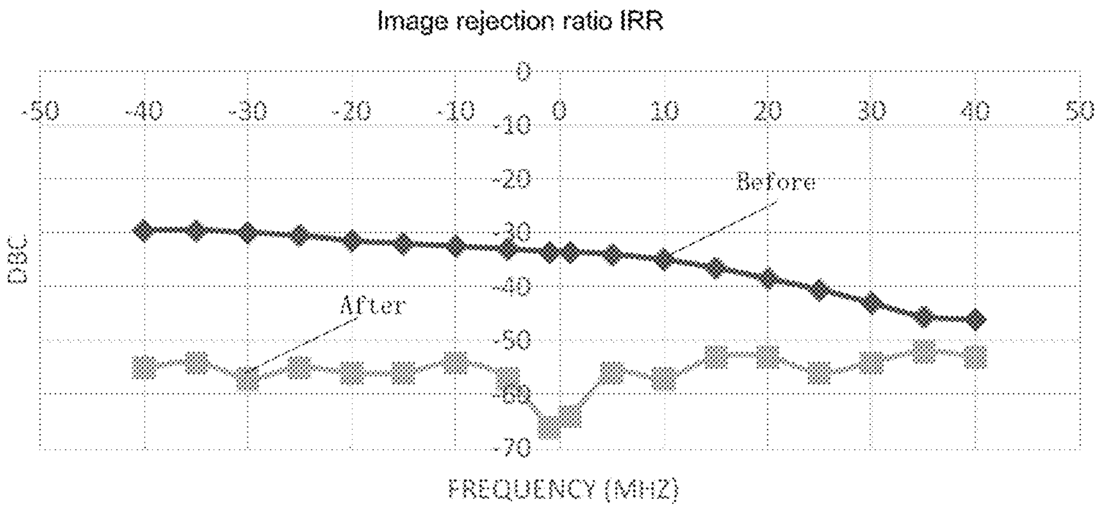
FIG. 9 is a diagram showing changes in the IRR before and after compensation by the application.

Through the three-stage compensation system provided by the above embodiment, broadband IQ imbalance can be compensated, the transmission path uses a pre-compensation, and the reception path uses a post-compensation. In terms of resource overhead, the first-stage non-frequency-selective compensation of this embodiment is equivalent to a first-order structure, which only requires four multipliers to complete; the second-stage phase filter only needs a few orders to meet the accuracy requirements of fractional delay; the third-stage amplitude filter, the order is related to the single-tone test accuracy requirements and the system sampling rate. According to actual measurements, 16th to 32nd orders can generally meet the requirements. The embodiment has a clear structure, and has advantages of easy structure control, low resource occupation and high compensation accuracy. And it has significant improvements in IRR, EVM, and bit error rate, etc. As shown in FIG. 7 to FIG. 9, shows the changes in phase error, amplitude error, and IRR before and after compensation in the actual measurements of the examples.

Other technical features are described in the previous embodiment, which will not be reiterated here.

As a further improvement, the application provides an alternative compensation embodiment. In this embodiment, the second-stage phase filter and the third-stage amplitude filter are combined, so as to design a single-channel filter module with fractional delay and amplitude compensation effect. The only difference from the previous embodiment is that the second-stage phase filter and the third-stage amplitude filter inside the FD-IQMC device are combined into one module. Correspondingly, the delay module in FIG. 5 and FIG. 6 is also adjusted to one, and other technical features remain unchanged.

Specifically, an IQ imbalance compensation method for WiFi broadband transmitting and receiving paths is provided. The embodiment is described in detail below.

For a transmitting path, an IQ signal output by a TX Baseband is input into a frequency-dependent IQ imbalance compensation device FD-IQMC for frequency-dependent IQ imbalance compensation, and the compensated output signal I'Q' is input to a digital-to-analog converter DAC.

For a receiving path, an IQ signal output by an analog-to-digital converter ADC is input into the frequency-dependent IQ imbalance compensation device FD-IQMC for frequency-dependent IQ imbalance compensation, and the compensated output signal I'Q' is input to a RX Baseband.

The FD-IQMC device is configured to: for an input IQ signal, according to an IQ imbalance parameter estimation value of the path, the FI-iqmc module performs single-point compensation for the input I-channel signal and the Q-channel signal by selecting the amplitude and phase error of one frequency point, so as to perform a frequency-independent overall compensation for the IQ imbalance, wherein the FI-iqmc module is a frequency-independent IQ imbalance compensation module. And then, for the I-channel signal and Q-channel signal output from the FI-iqmc module, selecting one of the signals to be input into the single-channel filter for processing to compensate for the phase and amplitude of frequency-selectivity. The filter coefficients of the single-channel filter are in a real number asymmetric form, and the filter coefficients of the single-channel filter are generated by convolving fractional delay filter coefficients with amplitude filter coefficients; wherein the phase-frequency response of the single-channel filter compensates for the fractional delay, and the amplitude-frequency response of the single-channel filter compensates for the amplitude error. Meanwhile, the other signal that is not selected is processed by the delay module to be time-aligned with the selected signal.

In this embodiment, the FD-IQMC device is configured as a two-stage compensation structure. After the IQ signal is compensated as a whole by the first-stage FI-iqmc module, one signal is selected from the I-channel signal and the Q-channel signal to be input into the second-stage single-channel filter module for compensation processing. The single-channel filter can compensate for the phase and amplitude of frequency-selective. For example, if the Q-channel signal is selected to enter the single-channel filter for frequency-selective phase and amplitude compensation, the I-channel signal is processed through a delay module to be time-aligned with the selected Q-channel signal.

Specifically, the filter coefficient of the single-channel filter is generated by convolving a fractional delay filter coefficient and an amplitude filter coefficient, and the phase-frequency response of the single-channel filter compensates for the fractional delay, and the amplitude-frequency response of the single-channel filter compensates for the amplitude error. The single-channel filter contains the characteristics of the previous two filters (i.e. the fractional delay filter and the amplitude filter) combined.

As an example, let the fractional delay filter coefficient be H1 and the amplitude filter coefficient be H2 (the filter coefficient of a general filter is a real number), then the filter coefficient of a single-channel filter is H=conv (H1, H2), and the function conv (H1, H2) represents the convolution of the return coefficients H1 and H2, wherein, H is the filter coefficient after convolution. The convolution operation on the coefficients H1 and H2 can be calculated based on software, and then the calculation results are configured in the memory RAM.

Compared with the three-stage compensation structure of the embodiment, the embodiment combines fractional delay processing and amplitude compensation processing into a single filter module for compensation processing. After combining, the filter coefficient H becomes a real asymmetric form. Compared with the real symmetric filter, the resource overhead will increase, technical personnel in this field can make adaptive choices according to needs. It should be noted that, compared with the conventional method of using a complex filter, the resource overhead of the combining solution is still relatively small.

Corresponding to the solution of combining the second-stage phase filter and the third-stage amplitude filter, the application provides another IQ imbalance compensation system for WiFi broadband transmitting and receiving paths. The system is a two-stage compensation structure of a FI-iqmc module and a single-channel filter.

In this embodiment, the system comprising a frequency-dependent IQ imbalance compensation device FD-IQMC, the FD-IQMC can be arranged in a transmitting path for pre-compensating an IQ signal to be input to a digital-to-analog converter DAC, and the FD-IQMC may also be arranged in a receiving path for post-compensating an IQ signal output by an analog-to-digital converter ADC.

The FD-IQMC device is configured as follows: for an input IQ signal, according to an IQ imbalance parameter estimation value of the path, the FI-iqmc module performs single-point compensation for the input I-channel signal and the Q-channel signal by selecting the amplitude and phase error of one frequency point, so as to perform a frequency-independent overall compensation for the IQ imbalance, wherein the FI-iqmc module is a frequency-independent IQ imbalance compensation module. And then, for the I-channel signal and Q-channel signal output from the FI-iqmc module, selecting one of the signals to be input into the single-channel filter for processing to compensate for the phase and amplitude of frequency-selectivity, wherein the filter coefficient of the single-channel filter is a real number asymmetric form, and the filter coefficient of the single-channel filter is generated by convolving a fractional delay filter coefficient and an amplitude filter coefficient; the phase-frequency response of the single-channel filter compensates for the fractional delay, and the amplitude-frequency response of the single-channel filter compensates for the amplitude error. Meanwhile, the other signal that is not selected is processed by the delay module to be time-aligned with the selected signal.

Other technical features are described in the previous embodiment, which will not be reiterated here.

In the above description, the disclosure of the application is not intended to limit itself in these respects. Rather, the various components may be selectively and operatively combined in any number within the intended scope of this disclosure. The steps of the methods or algorithms described in conjunction with the embodiments disclosed herein may be implemented directly using hardware, a software module executed by a processor, or a combination of the two. The software module can be placed in random access memory (RAM), memory, read-only memory (ROM), electrically programmable ROM, electrically erasable programmable ROM, registers, hard disk, removable disk, CD-ROM, or any other form of storage medium known in the technical field.

Additionally, terms like "comprising", "including" and "having" should by default be construed as inclusive or open, rather than exclusive or closed, unless explicitly defined to the contrary. All technical, scientific or other terms have the meaning as understood by those skilled in the art unless they are defined to the contrary. Common terms found in dictionaries should not be interpreted too ideally or too practically in the context of related technical documents unless this disclosure explicitly defines them as such. Any changes and modifications made by those of ordinary skill in the field of the application according to the above disclosure fall within the protection scope of the claims.

What is claimed is:

1. An IQ imbalance compensation system for WiFi broadband transmitting and receiving paths, the system comprising:

a frequency-dependent IQ imbalance compensation (FD-IQMC) device configured to:

for a transmitting path, receive an IQ signal output by a TX Baseband, perform frequency-dependent IQ imbalance compensation on the received IQ signal, and output a compensated output signal I'Q' to a digital-to-analog converter (DAC); and for a receiving path, receive an IQ signal output by an analog-to-digital converter (ADC), perform frequency-dependent IQ imbalance compensation on the received IQ signal, and output a compensated output signal I'Q' to an RX Baseband;

the FD-IQMC device comprises a FI-iqmc module, a Frac-delay filter and an Amp-FIR filter wherein the FI-iqmc module is a frequency-independent IQ imbalance compensation module, and the Frac-delay filter is a fractional delay filter, and the Amp-FIR filter is a real number symmetric amplitude filter;

wherein the FD-IQMC device is further configured to:

(a) for an input IQ signal, based on an IQ imbalance parameter estimation value of the path, use the FI-iqmc module to perform single-point compensation for the input I-channel signal and the Q-channel signal by selecting an amplitude error and a phase error of one frequency point, so as to perform a frequency-independent overall compensation for the IQ imbalance;

(b) after (a), select one of the I-channel and Q-channel signals output from the FI-iqmc module to be input into the Frac-delay filter;

(c) perform phase compensation by the Frac-delay filter on the selected signal to compensate for imbalance in a frequency-selective phase, wherein to perform phase compensation, the Frac-delay filter is configured to:

(i) obtain phase errors at sampling frequency points within a broadband through single-tone testing of multiple frequency points;

(ii) perform linear fitting on the obtained phase errors;

(iii) calculate a factor Group delay according to phase errors subsequent to the linear fitting, the factor Group delay represents a phase error group delay in a broadband, and the calculation formula is as follows:

$$\text{Group delay} = \frac{\Delta\varphi\,(\text{radian})}{\Delta\omega\,(\text{radian})},$$

wherein Δφ(radian) is the phase error change within the Δφ(radian) frequency band;

(iv) calculate a fractional delay sample value to be compensated according to the value of the factor Group delay, and then, design a fractional delay value of the Frac-delay filter through a Lagrange interpolation method based on the fractional delay sample value to be compensated; and (v) perform phase compensation on the selected signal according to the designed Frac-delay filter to obtain a phase-compensated signal;

(d) input the phase-compensated signal output from the Frac-delay filter into the Amp-FIR filter;

(e) perform amplitude compensation on the phase-compensated signal using the Amp-FIR filter to compensate for imbalance in a frequency-selective amplitude, wherein to perform amplitude compensation, the Amp-FIR filter is configured to:

(i) obtain amplitude errors at sampling frequency points within a broadband through single-tone testing of multiple frequency points;

(ii) perform an averaging operation on the amplitude errors at the sampling frequency points with symmetric positive and negative frequencies;

(iii) design a real number filter with an order of N, wherein amplitude error parameters at filter frequency points are obtained through piecewise linear interpolation of test frequency points, the parameter N is an integer multiple of 2;

(iv) calculate filter coefficients of the real number filter through an inverse fast Fourier transform method according to the amplitude error parameters of the filter frequency points, wherein the filter coefficients are real numbers and are symmetric; and (v) filtering the signal through the filter coefficients to obtain an amplitude-compensated signal; and (f) while (c) and (e) are performed on the selected signal, process the non-selected signal by a delay module to time-align the non-selected signal with the phase-compensated signal;

wherein the FI-iqmc module is configured to compensate for IQ imbalance by applying a phase compensation and an amplitude compensation to an I-channel signal and a Q-channel signal based on a phase imbalance factor Δφ and an amplitude imbalance factor Δm, wherein the phase compensation applied to the I-channel signal is −Δφ/2, the amplitude compensation applied to the I-channel signal is −Δm/2, the phase compensation applied to the Q-channel signal is Δφ/2, and the amplitude compensation applied to the Q-channel signal is Δm/2.

2. The system according to claim 1, wherein the IQ imbalance parameter estimation value of the transmitting path and the receiving path is obtained by single-tone testing, and single tones of multiple frequency points correspond to IQ imbalance parameter estimation values of multiple frequency points.

3. The system according to claim 1, further comprising: while the Amp-FIR filter performs amplitude compensation on the signal output by the Frac-delay filter, the signal output from the delay module is input into a second delay module for delay processing to align the timing of the delay module output signal and the amplitude compensated signal.

4. An IQ imbalance compensation system for WiFi broadband transmitting and receiving paths, the system comprising:

a frequency-dependent IQ imbalance compensation (FD-IQMC) device, wherein the FD-IQMC is configurable to be arranged in a transmitting path for pre-compensating an IQ signal to be input to a digital-to-analog converter (DAC), and is configurable to be arranged in a receiving path for post-compensating an IQ signal output by an analog-to-digital converter (ADC);

the FD-IQMC device comprises a FI-iqmc module and a single-channel filter module wherein the FI-iqmc module is a frequency-independent IQ imbalance compensation module, and filter coefficients of the single-channel filter are in a real number asymmetric form, and the filter coefficients of the single-channel filter are generated by convolving fractional delay filter coefficients with amplitude filter coefficients; wherein a phase-frequency response of the single-channel filter compensates for a fractional delay, and amplitude-frequency response of the single-channel filter compensates for an amplitude error;

wherein the FD-IQMC device is further configured to:

(a) for an input IQ signal, based on an IQ imbalance parameter estimation value of the path, the FI-iqmc module performs single-point compensation for the input I-channel signal and the Q-channel signal by selecting an amplitude error and a phase error of one frequency point, thereby performing a frequency-independent overall compensation for the IQ imbalance;

(b) after (a), for the I-channel signal and Q-channel signal output from the FI-iqmc module, select one of the I-channel and Q-channel signals output from the FI-iqmc module to be input into the single-channel filter for processing to compensate for phase and amplitude of frequency-selectivity; and (c) while (b) is performed on the selected signal, process the non-selected signal by a delay module to time-align the non-selected signal with the compensated signal of the single-channel filter;

wherein the FI-iqmc module is configured to compensate for IQ imbalance by applying a phase compensation and an amplitude compensation to an I-channel signal and a Q-channel signal based on a phase imbalance factor $\Delta\varphi$ and an amplitude imbalance factor $\Delta m$, wherein the phase compensation applied to the I-channel signal is $-\Delta\varphi/2$, the amplitude compensation applied to the I-channel signal is $-\Delta m/2$, the phase compensation applied to the Q-channel signal is $\Delta\varphi/2$, and the amplitude compensation applied to the Q-channel signal is $\Delta m/2$.

* * * * *